(12) United States Patent
Tamura (10) Patent No.: US 9,019,540 B2
(45) Date of Patent: Apr. 28, 2015

(54) CHANGING SPEED OF NETWORK CONNECTION DEPENDING UPON SLEEP STATE OF NETWORK CONTROLLER

(71) Applicant: KYOCERA Document Solutions Inc., Osaka (JP)

(72) Inventor: Yoshiaki Tamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/066,318

(22) Filed: Oct. 29, 2013

(65) Prior Publication Data

US 2014/0118771 A1 May 1, 2014

(30) Foreign Application Priority Data

Oct. 31, 2012 (JP) ................. 2012-240085

(51) Int. Cl.
*G06F 3/12* (2006.01)
*H04N 1/00* (2006.01)

(52) U.S. Cl.
CPC .... *H04N 1/00204* (2013.01); *H04N 2201/0034* (2013.01); *H04N 1/00896* (2013.01); *H04N 2201/0039* (2013.01); *H04N 2201/0049* (2013.01); *H04N 2201/0094* (2013.01)

(58) Field of Classification Search
CPC ....... G06F 1/32; G06F 1/3203; G06F 1/3287; H04N 1/00896; H04N 1/00204
USPC ........................................ 358/1.15
See application file for complete search history.

(56) References Cited

U.S. PATENT DOCUMENTS

2007/0249383 A1* 10/2007 Wiklof et al. ................. 455/522

FOREIGN PATENT DOCUMENTS

| JP | 2002-271334 A | 9/2002 |
| JP | 2010-171792 A | 8/2010 |

* cited by examiner

*Primary Examiner* — Eric A Rust
(74) *Attorney, Agent, or Firm* — Studebaker & Brackett PC (57) ABSTRACT

A network controller includes a communication portion, a disconnection portion, a change portion, and a re-linking portion. The communication portion is capable of communicating with another network device via a network. The disconnection portion temporarily disconnects communication from the communication portion to the other network device when a sleep signal instructing a shift from a normal state to a sleep state is received. The change portion changes a speed of the disconnected communication from the communication portion to the other network device, to a communication speed lower than a communication speed in the normal state. The re-linking portion causes the communication portion to communicate with the other network device at the changed communication speed.

7 Claims, 6 Drawing Sheets

CHANGING SPEED OF NETWORK CONNECTION DEPENDING UPON SLEEP STATE OF NETWORK CONTROLLER

INCORPORATION BY REFERENCE

The present application claims priority under 35 U.S.C. §119 to Japanese Patent Application No. 2012-240085, filed Oct. 31, 2012. The contents of this application are incorporated herein by reference in their entirety.

BACKGROUND

The present disclosure relates to a network controller and a network controlling method, and in particular to a network controller and a network controlling method that allow achieving power saving by reducing communication speed during the sleep state.

In recent years, a network interface card (hereinafter referred to as an NIC) has been used for connecting a computer and another device to the network in transmitting and receiving information and data between the computer and the other device via the network.

The NIC is attached to an extension slot (bus) such as a computer and a workstation on the LAN that is a network. After connecting the LAN cable to the NIC, the NIC, controlled by driver software, transmits the data.

An example of the NIC technology is a media access controller that can be used for an Ethernet (trademark) of any one of the formats from among 10BASE-T, 100BASE-T, and 10BASE-2, using a single medium access control (MAC) chip.

However, the NIC must constantly receive and process packets from the network and therefore the power needs to be always ON. Also available on the market is a MAC chip that is capable of activating a host device only when it receives a specific Ethernet (trademark) packet (Magic-Packet), but this type has a problem of causing restrictions in practical use due to its dependence on the packet generation capacity of the sending side. In addition, for this reason, there is a growing need for suppressing power consumption during a standby state while maintaining a communication function (the function to process an Ethernet (trademark) packet that is received).

A terminal controller is connected to a terminal device that is connected to another terminal device via a network, and controls the speed of data transfer from the terminal device. A network terminal controller includes a receiving portion and a reception determination portion. The receiving portion receives a data communication request transmitted from the terminal device to the other terminal device within the network. In addition, the receiving portion receives a data communication request transmitted to the terminal device from the other terminal device within the network. The reception determination portion determines whether or not the receiving portion has received the data communication request for a given time. In addition, the network terminal controller includes a sending portion and a speed switching portion. The sending portion transmits the data communication request received by the receiving portion, to the terminal device or the other terminal device within the network at a predetermined data transfer speed. The speed switching portion switches the predetermined speed of the data transfer performed by the sending portion. Then, the speed switching portion switches the data transfer speed to a lower speed when the reception determination portion determines that no data communication request has been received for the given time. When the receiving portion receives a data communication request from the terminal device or the other terminal device within the network, the speed switching portion switches the speed of the data transfer performed by the sending portion to a higher speed. This allows reducing the power consumption of the NIC in a simple manner while maintaining the function of the network communication without change in hardware. As a result, it is possible to suppress the power consumption during a standby time.

In addition, a network device is connected to another network device via a network so as to allow communication at a plurality of communication speeds. During the standby time, if no communication request has been received for a given time, the network device changes the setting by switching the communication speed to a low-speed mode (energy-saving mode) in N levels. The network device, which has received a data communication request from the other network device, completes the communication at a communication speed that is currently set. The network device, after completion of the communication, performs setting by switching the communication speed to a high-speed mode. This allows reducing power consumption. In addition, in the case of transmitting a very small amount of data from the original document, for example, this would prevent such cases where switching the communication speed takes more time for printout that would be promptly performed without the switching, thus securing usability.

SUMMARY

A network controller according to the present disclosure can be shifted from a normal state to a sleep state. The network controller in the present disclosure includes a communication portion, a disconnection portion, a change portion, and a re-linking portion. The communication portion is capable of communicating with another network device via a network. Upon receiving a sleep signal instructing a shift from the normal state to the sleep state, the disconnection portion temporarily disconnects the communication from the communication portion to the other network device. The change portion changes the speed of the disconnected communication from the communication portion to the other network device, to a communication speed lower than the communication speed in the normal state. The re-linking portion causes the communication portion to communicate with the other network device at the changed communication speed.

A network controlling method according to the present disclosure, in a network controller that includes a communication portion capable of communicating with another network device via a network and can be shifted from a normal state to a sleep state, includes: temporarily disconnecting the communication from the communication portion to the other network device when a sleep signal instructing a shift from the normal state to the sleep state is received; changing a communication speed of the disconnected communication from the communication portion to the other network device, to a communication speed lower than a communication speed in the normal state; and causing the communication portion to communicate with the other network device at the changed communication speed.

A computer-readable recording medium according to the present disclosure holds a program for causing a computer to execute the network controlling method described above.

DETAILED DESCRIPTION

For an understanding of the present disclosure, the following describes an embodiment of a network controller according to the present disclosure with reference to attached drawings. It should be noted that the embodiment as described below is merely an example of embodiments of the present disclosure and does not limit the technical scope of the present disclosure. In addition, an alphabet S assigned before each numeral in the flowchart stands for a step.

<Network Controller>

Figure 1:
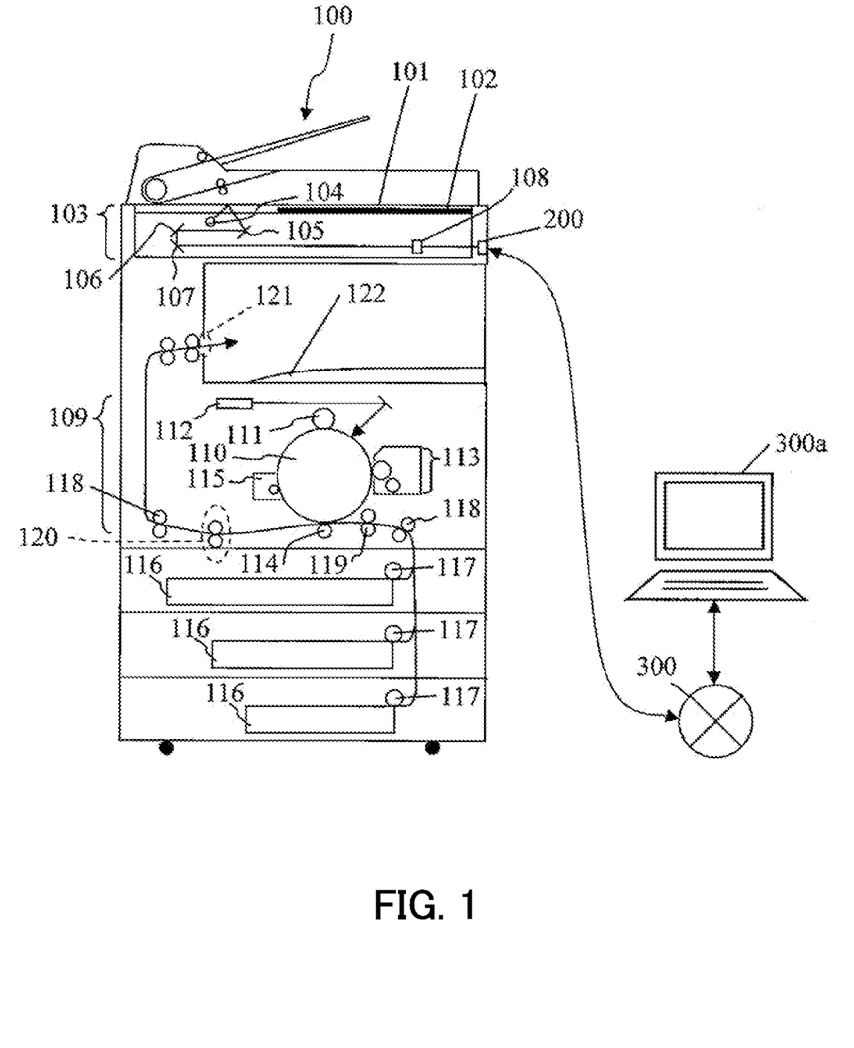
FIG. 1 is a conceptual diagram showing an overall configuration of an inside of a multifunction peripheral according to the present disclosure.

The following describes an image forming apparatus having a communication function as a network controller according to the present disclosure. FIG. 1 is a schematic diagram of an image forming apparatus according to an embodiment of the present disclosure. However, details of each portion that is not directly related to the present disclosure are omitted.

It should be noted that the image forming apparatus according to the present disclosure corresponds to a multifunction peripheral that includes, for example, a facsimile function, and further includes functions of a copier, a scanner, a printer, and so on. The image forming apparatus functions as an image forming apparatus having the functions of a facsimile, a copier, a scanner, a printer, and so on.

The following briefly describes, for example, operations of a multifunction peripheral 100 (MFP) for the user intending to use the functions of a copier and a facsimile.

First, when using the multifunction peripheral 100, the user places an original document on a copy holder 101 that is provided in a top face of a casing. Subsequently, the user enters setting conditions related to image formation and facsimile function (such as paper size and destination), using an operation portion 102 (operation panel) provided near the copy holder 101, through an initial screen (operation screen) of the operation portion 102. Then, the user selects one of: a copy function corresponding to the image formation, and a facsimile function corresponding to the facsimile function. Then, when a start key in the operation portion 102 is pressed, the multifunction peripheral 100 starts the selected function.

Here, in an image reading portion 103, the light emitted from a light source 104 is reflected on the original document placed on the copy holder 101. The reflected light is guided to an image sensor 108 by mirrors 105, 106, and 107. The image sensor 108 performs photo-conversion on the guided light, thus generating image data corresponding to the original document.

On the other hand, when a facsimile transmission function is selected in the above, a communication portion 200 transmits the image data, via a network 300, to another destination network device that is entered (for example, a terminal device 300a, PC). It should be noted that the communication portion 200 communicably connects the multifunction peripheral 100 to the other network device 300a via the network 300.

On the other hand, for example, when the other network device 300a transmits predetermined image data to the multifunction peripheral 100, the communication portion 200 receives the image data and either causes a predetermined memory to temporarily hold the image data or transmits the image data, for example, to an image forming portion 109 that is to be described below.

Here, the image forming portion 109 is a portion that generates a toner image based on the image data. The image forming portion 109 includes a photosensitive drum 110. The photosensitive drum 110 rotates into a predetermined direction at a given speed, and in the peripheral thereof, in order from an upstream in the rotational direction, there are provided: a charger 111, an exposure unit 112, a developing counter 113, a transfer device 114, a cleaning unit 115, and so on.

The charger 111 uniformly charges the surface of the photosensitive drum 110. The exposure unit 112 irradiates the surface of the charged photosensitive drum 110 with a laser, based on the image data, so as to form an electrostatic latent image. The developing counter 113 forms a toner image by attaching toner to the electrostatic latent image thus formed. The transfer device 114 transfers the formed toner image onto a recording medium (for example, paper or sheet). The cleaning unit 115 removes extra toner remaining on the surface of the photosensitive drum 110. This series of processes are performed by the rotation of the photosensitive drum 110.

The sheet is conveyed from a plurality of paper feed cassettes 116 included in the multifunction peripheral 100. The sheet, when conveyed, is drawn from one of the paper feed cassettes 116 into a conveyance path by a pickup roller 117. Each paper feed cassette 116 contains a different type of paper, and feeds a sheet based on the setting condition for image formation.

The sheet drawn out into a conveyance path is sent between the photosensitive drum 110 and the transfer device 114 by a conveyance roller 118 and a resist roller 119. When the sheet is fed, the toner image is transferred onto the sheet by the transfer device 114, and is conveyed to a fusing device 120.

When the sheet on which the toner image has been transferred passes between a heating roller and a pressure roller that are included in the fusing device 120, heat and pressure is applied to the toner image, so that a visual image is fused onto the sheet. The heat volume of the heating roller is optimally set according to the paper type, so as to perform fusing appropriately. The visual image is fused onto the sheet, and thus the image formation is completed. A conveyance roller 118 ejects the sheet, via an exit port 121, into an inner tray 122 provided in the inside of the casing. The sheet is stacked and stored in the inner tray 122. According to the above procedures, the casing of the multifunction peripheral 100 provides an image forming function and a facsimile receiving function to the user.

Figure 2:
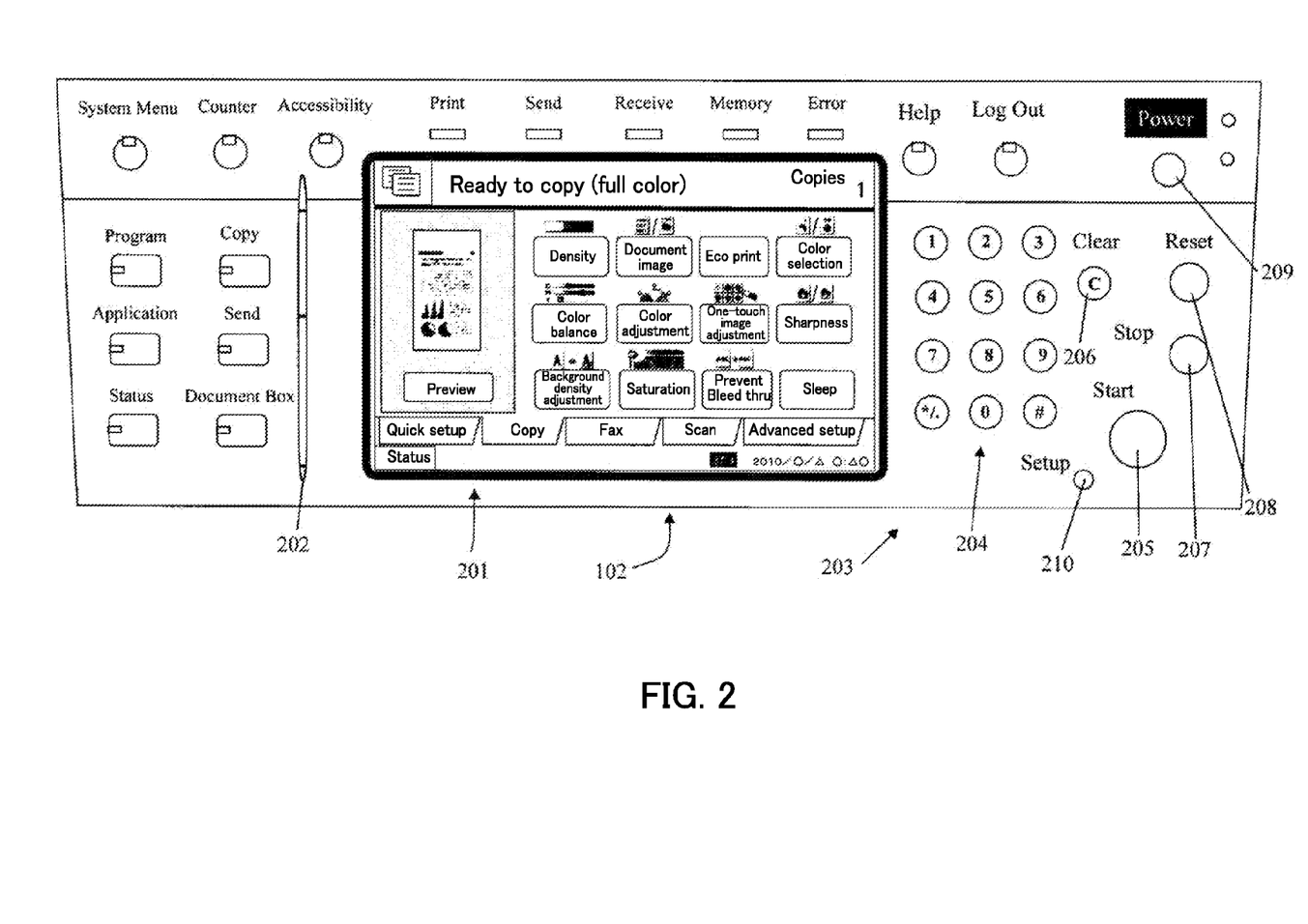
FIG. 2 is a conceptual diagram showing an overall configuration of an operation portion according to the present disclosure.

FIG. 2 is a conceptual diagram showing an overall configuration of an operation portion according to an embodiment of the present disclosure. The user, using the operation portion 102, enters a setting condition for the image formation or the facsimile function as described above or checks the setting condition that has been entered. For entering the setting condition, the touch panel 201 (operation panel), a touch pen 202, and an operation key 203 that are provided in the operation portion 102 are used.

The touch panel 201 has both a function to enter a setting condition and a function to display the setting condition. In other words, by pressing a key in the screen displayed on the touch panel 201, the setting condition corresponding to the pressed key is entered.

In the back of the touch panel 201, a display portion (not shown) such as a liquid crystal display (LCD) is provided, and the display portion displays, for example, an operation screen such as an initial screen. The touch pen 202 is provided near the touch panel 201, and when the user touches the touch panel 201 with a tip of the touch pen 202, a sensor provided under the touch panel 201 detects the point of contact.

Furthermore, near the touch panel 201, a predetermined number of operation keys 203 are provided: for example, a numeric keypad 204, a start key 205, a clear key 206, a stop key 207, a reset key 208, and a power key 209.

Figure 3:
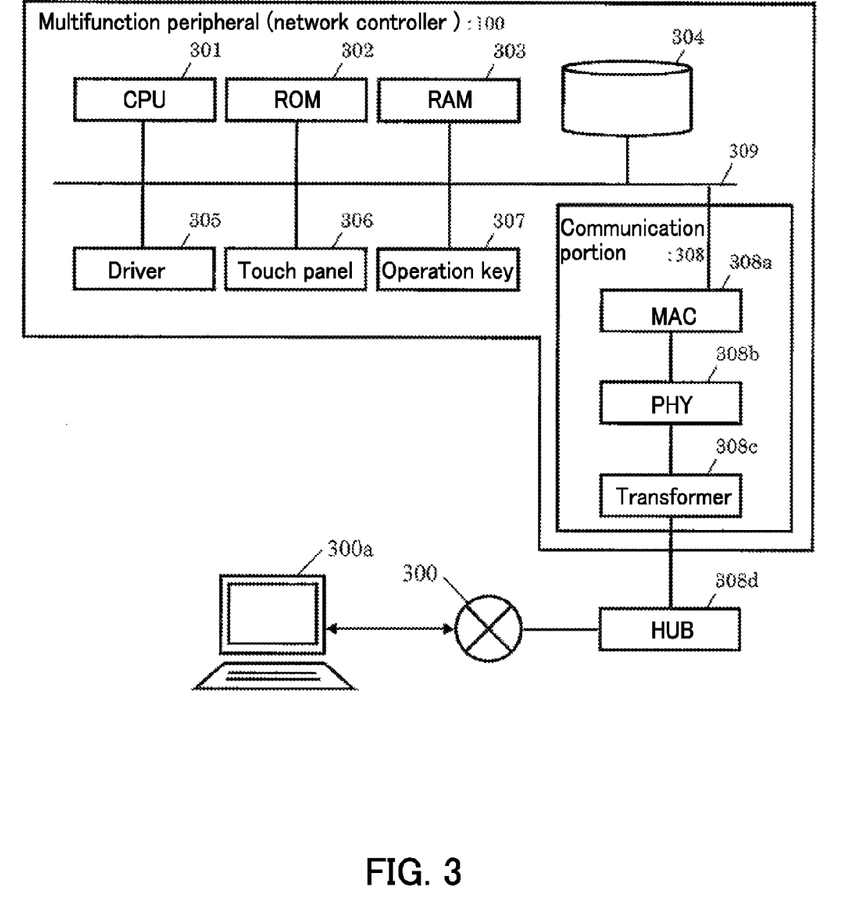
FIG. 3 is a diagram showing a configuration of control system hardware of a multifunction peripheral according to the present disclosure.

Next, described below is the configuration of control system hardware of the multifunction peripheral 100 with reference to FIG. 3. FIG. 3 is a diagram showing the configuration of the control system hardware of the multifunction peripheral 100 according to the present disclosure. However, details of each portion that is not directly related to the present disclosure are omitted.

In a control circuit of the multifunction peripheral 100, connected through an internal bus 309 are: a central processing unit (CPU) 301, a read-only memory (ROM) 302, a random-access memory (RAM) 303, a hard disk drive (HDD) 304, a driver 305 corresponding to each drive portion, a touch panel 306 (201), an operation key 307 (203), and a communication portion 308 (communication portion 200).

The CPU 301, for example, uses the RAM 303 as a work area. Then, the CPU 301 executes a program stored on the ROM 302, the HDD 304, and so on. Then, based on the result of the execution, the CPU 301 transmits and receives the data and an instruction from the driver 305, the touch panel 306, and the communication portion 308 as well as a signal, an instruction, or the like that corresponds to the operation key 307, and controls the operation of each drive portion shown in FIG. 1.

In addition, the communication portion 308 includes a media access controller (MAC) 308a, a physical layer (PHY) 308b, and a transformer 308c. The communication portion 308 is connected to the network 300 via a HUB 308d.

The MAC 308a divides into packets and assembles the data that is transmitted and received, according to the standard of the network 300. The MAC 308a controls the header and the footer for an address and error detection.

The PHY 308b is an IC having a function of a physical layer of the OSI Reference Model. The PHY 308b converts coded data into a signal according to the signal standard of the transmission cable and also encodes a received signal. In addition, the PHY 308b is used for switching the speed of the communication with the other network device 300a that is communicably connected via the network. The PHY 308b includes a circuit block that transmits a clock corresponding to the communication speed.

The transformer 308c secures electric insulation between the multifunction peripheral 100 and the other network device 300a that is connected to the multifunction peripheral 100.

The HUB 308d is connected to the network 300. The HUB 308d receives the data from the other network device 300a via the network 300. The HUB 308d, like a normal HUB, may function as a repeater and receive all the data transmitted from the other network device 300a. Alternatively, the HUB 308d, like a switching hub, may also be configured to function as a bridge and analyze the data transmitted from the other network device 300a so as to detect a predetermined destination so that only the data from a specific destination is to be accepted (filtering function).

It should be noted that the network 300 includes a local area network (LAN) or the Internet.

In addition, each portion (shown in FIG. 4) other than the drive portion, which is to be described below, is also realized by the CPU 301 executing the program. A program and data for realizing each portion as described below are stored on the ROM 302, the HDD 304, and so on.

Embodiment

Figure 4:
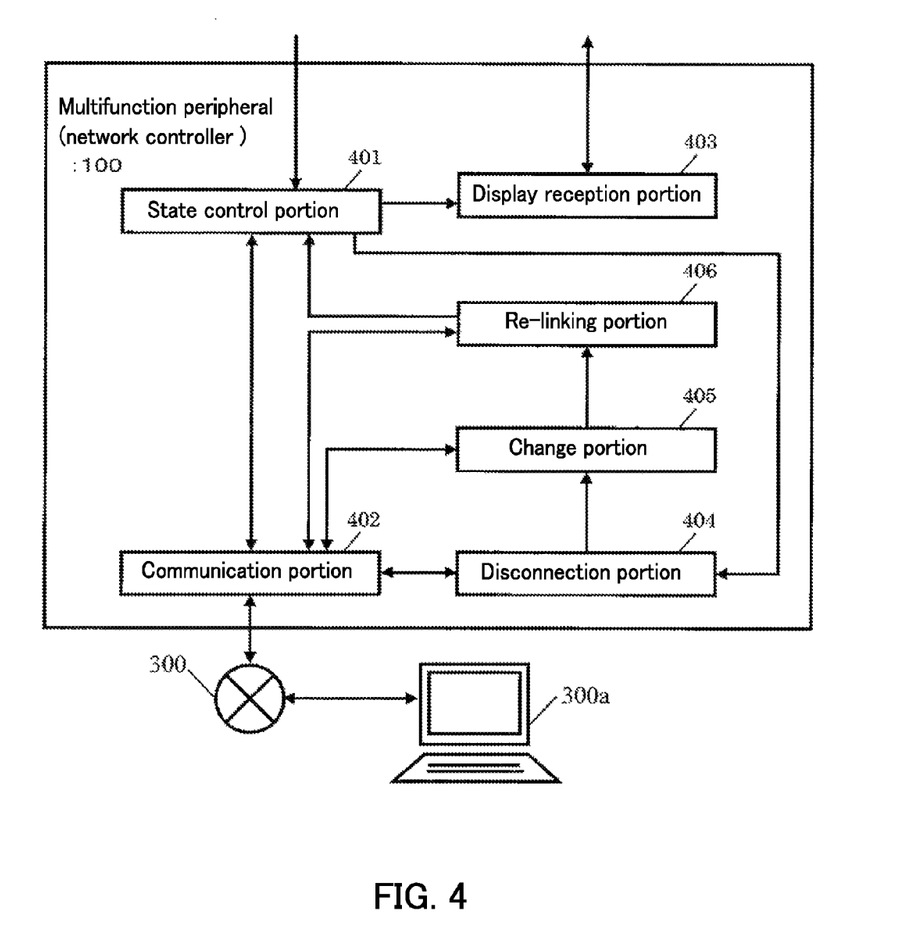
FIG. 4 is a functional block diagram of a multifunction peripheral in an embodiment according to the present disclosure.
Figure 5:
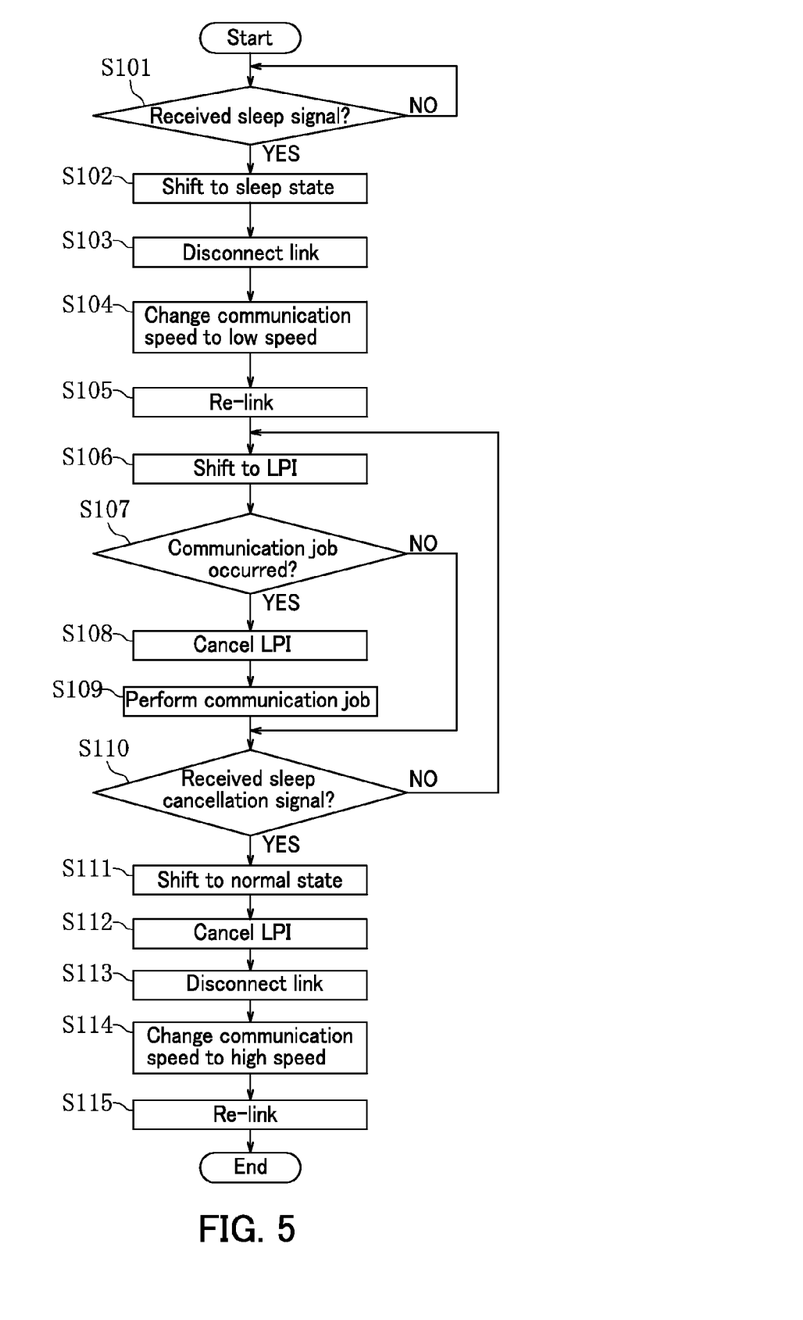
FIG. 5 is a flowchart of an execution procedure in the embodiment according to the present disclosure.

Next, the following describes a configuration and an execution procedure according to an embodiment of the present disclosure with reference to FIG. 4 and FIG. 5. FIG. 4 is a functional block diagram of a multifunction peripheral according to the present disclosure. In addition, FIG. 5 is a flowchart of an execution procedure according to the present disclosure.

First, the user turns on the power of the multifunction peripheral 100 that is communicably connected to the other network device 300a via the network 300. A state control portion 401 in the multifunction peripheral 100, by supplying power to respective portion including the control portion and the drive portion, shifts the state from an idle state to a normal state in which the multifunction peripheral 100 is ready to perform functions of its own.

Here, the multifunction peripheral 100, thus activated, functions as a network controller. The communication portion 402 (communication portion 200) in the multifunction peripheral 100, when supplied with power, changes (sets) a set value of a register included in the PHY 308b to a communication speed in the normal state, that is, another set value corresponding to a high communication speed that is set in advance (for example, 1000BASE). Next, the communication portion 402 supplies power to the MAC 308a, and starts linking with the HUB 308d, so as to check whether or not communication with the other network device 300a is possible. When the result of the check shows that communication is possible, it is shown that the communication portion 402 has shifted to the normal state in which a communication job can be performed.

It should be noted that supplying power to a circuit block (referred to as a first circuit block), which is included in the PHY 308b and transmits a clock (125 MHz) corresponding to the set high communication speed, enables the communication portion 402 to communicate at the communication speed.

In addition, the display reception portion 403 (operation portion) of the activated multifunction peripheral 100 displays, on the touch panel, an initial screen (operation screen) that is set in advance.

Figure 6:
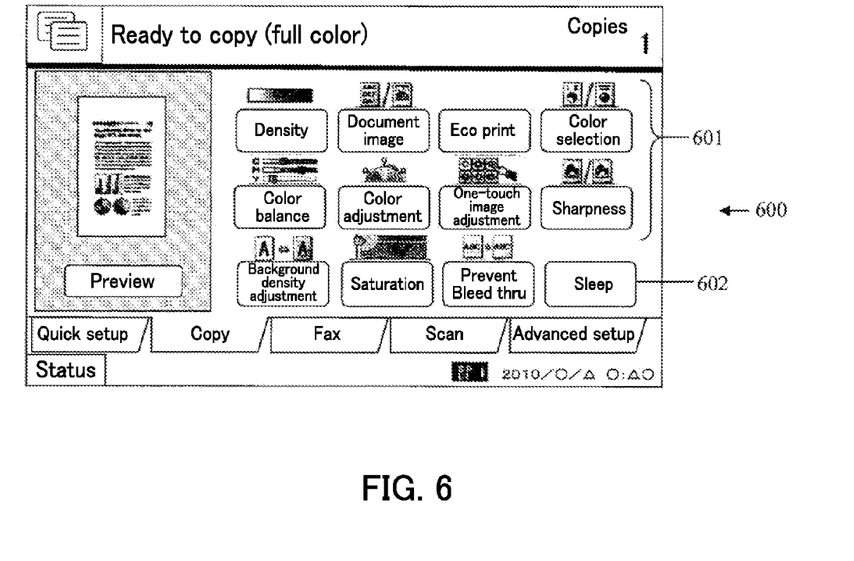
FIG. 6 is a diagram showing an example of an initial screen displayed on a touch panel in the embodiment according to the present disclosure.

On an initial screen 600, as shown in FIG. 6, displayed so as to allow pressing are: an item setting key 601 for setting the function of the multifunction peripheral 100, and a sleep key 602 for shifting the state from the normal state to the sleep state in which a smaller amount of power is consumed than the power consumed during the normal state.

Here, when, for example, the user presses the sleep key 602 looking at the initial screen 600, the display reception portion 403 receives the pressing of the sleep key 602, that is, a sleep signal instructing a shift to the sleep state (FIG. 5: S101 YES), and notifies the state control portion 401 of the instruction. The state control portion 401, which has received the notice, suspends (disconnects) the power supply to the drive portion while maintaining the power supply to the control portion, thus shifting the state to the sleep state (FIG. 5: S102).

Here, in the case of receiving the sleep signal by the state control portion 401, for example, the reception may be performed by other than pressing the sleep key 602 by the user.

For example, when the multifunction peripheral 100 is activated, the display reception portion 403 starts measuring, using a predetermined timer, an amount of time that has elapsed from the point of the activation of the multifunction peripheral 100, and determines whether or not the elapsed time exceeds a predetermined sleep shift time that is set in advance (for example, 5 minutes, 10 minutes, and so on). If the result of the determination shows that the elapsed time exceeds the sleep shift time, the display reception portion 403 may notify the state control portion 401 of the sleep signal (FIG. 5: S101 YES) whereby the state control portion 401 may receive the sleep signal.

On the other hand, the state control portion 401, which has received the sleep signal, notifies the disconnection portion 404 of the reception. The disconnection portion 404, which has received the notice, temporarily disconnects the communication (link) from the communication portion 402 to the other network device (FIG. 5: S103).

Specifically, the disconnection portion 404 temporarily suspends the link from the PHY 308*b* to the HUB 308*d* in the communication portion 402. This allows changing the set value of the register included in the PHY 308*b*.

Next, the disconnection portion 404, after completion of the temporary disconnection of the communication from the communication portion 402, notifies the change portion 405 of the completion. The change portion 405, which has received the notice, changes the communication speed from the communication portion 402 to the other network device 300*a*, to a communication speed lower than the communication speed in the normal state (FIG. 5: S104).

Specifically, the change portion 405 changes (sets) the set value of the register included in the PHY 308*b* of the communication portion 402 from the set value corresponding to the high communication speed (1000BASE) to the set value corresponding to the low communication speed (100BASE).

Then, after completion of the change in the communication speed, the change portion 405 notifies the re-linking portion 406 of the completion. The re-linking portion 406, which has received the notice, causes the communication portion 402 to communicate (be relinked) with the other network device 300*a* at the changed communication speed (FIG. 5: S105).

Specifically, the re-linking portion 406 resumes the link from the PHY 308*b* to the HUB 308*d* in the communication portion 402, so as to check whether or not communication with the other network device 300*a* is possible. If the result of the check shows that communication is possible, the re-linking portion 406 completes the resumption of the communication from the communication portion 402. It should be noted that a method for checking whether or not communication with the other network device 300*a* is possible is performed by conducting, for example, a predetermined link test and monitoring a link pulse.

The re-linking portion 406, after completion of the resumption of the communication from the communication portion 402, notifies the state control portion 401 of the completion. The state control portion 401, which has received the notice, shifts the state of the communication portion 402 to low power idle (LPI) (mode) according to the IEEE802.3az standard (FIG. 5: S106). Here, the LPI refers to: suspending the power supply to the MAC 308*a* in the communication portion 402 when there is no communication job, and starting (resuming) the power supply to the MAC 308*a* when a communication job occurs. Here, the state control portion 401 suspends the power supply to the MAC 308*a* in the communication portion 402.

Here, when shifting to the LPI is completed, although the power supply to the PHY 308*b* in the communication portion 402 continues, the PHY 308*b*, as described above, is set to a low communication speed. Therefore, the communication portion 402 is to supply power to a circuit block (referred to as a second circuit block) that is included in the PHY 308*b* and transmits a clock (50 MHz) corresponding to the low communication speed, and to suspend the power supply to the first circuit block corresponding to the high communication speed. As a result, this allows reducing the amount of unnecessary power supply to the first circuit block, thus reducing wasteful power consumption.

For example, in the case of a certain network controller in which the PHY 308*b*, during the sleep state, remained active at a high communication speed (1000BASE) and thus consumed 140 mW, for example. On the other hand, in the case of the present disclosure, the PHY 308*b*, during the sleep state, remained active at a low communication speed (100BASE) and thus consumed 79 mW, for example. Thus, according to the present disclosure, it is possible to reduce the power consumption in the communication portion 402 to about half the power consumption of the certain network controller.

In addition, normally, the communication speed of the PHY 308*b* in the communication portion 402 cannot be changed by the user operation. Whereas, according to the present disclosure, the user is able to change the communication speed by pressing the sleep key 602. This accordingly allows the user to reduce the communication speed easily, thus allowing reduction in the power consumption of the communication portion 402.

Furthermore, since, during the sleep state, in particular, it is not necessary to perform communication with the other network device 300*a* at the high communication speed, the configuration as described above is less likely to cause a delay in business due to a delay in the communication job.

On the other hand, in the state as described above, when, for example, a transmission of predetermined image data (communication job) from the other network device 300*a* (for example, a terminal device or a facsimile device) occurs in the multifunction peripheral 100, the communication portion 402 in the multifunction peripheral 100, in response to the occurrence of the communication job (FIG. 5: S107 YES), notifies the state control portion 401 of the occurrence. The state control portion 401, which has received the notice, cancels the LPI while maintaining the communication speed of the communication portion 402 (PHY 308*b*) (FIG. 5: S108), that is, starts a power supply to the MAC 308*a* in the communication portion 402. In response to the supply, the communication portion 402 performs a communication job (FIG. 5: S109). In the case described above, for example, the communication portion 402 causes a predetermined memory (such as a facsimile BOX) to hold the received image data.

With this, the communication job received in the sleep state is performed at the low communication speed, which causes no particular problem because the communication job is only to be received by the multifunction peripheral 100 and is therefore not urgent.

Then, the communication portion 402, after completion of the execution of the communication, notifies the state control portion 401 of the completion. The state control portion 401, which has received the notice, determines whether or not a sleep cancellation signal instructing a cancellation of the sleep state has been received (FIG. 5: S110).

Here, any method may be used for determining whether or not the state control portion 401 has received the sleep cancellation signal. For example, when a communication job occurs (FIG. 5: S107 YES), there is a method of checking by causing the state control portion 401 to check whether or not the communication job includes the sleep cancellation signal.

In addition, when no communication job occurs (FIG. 5: S107 NO), there is a method of checking by causing the state control portion 401 to receive, from the display reception portion 403, the pressing of the start key 205, the reset key 208, or the power key 209 by the user (that is, the pressing of the key corresponding to the sleep cancellation).

If the result of the determination shows that the sleep cancellation signal has not been received (FIG. 5: S110 NO), the state control portion 401 determines that the sleep state may be maintained, and returns to S106 to shift the communication portion 402 (PHY 308b) to the LPI while maintaining the communication speed of the communication portion 402 (FIG. 5: S106). This sets off the same sleep state as described earlier.

On the other hand, if the result of the determination shows that the sleep cancellation signal has been received (FIG. 5: S110 YES), the state control portion 401 determines that the state should be shifted from the sleep state to the normal state, and shifts the state to the normal state by starting (resuming) a power supply to the drive portion (FIG. 5: S111).

Next, the state control portion 401 cancels the LPI (FIG. 5: S112), and notifies the disconnection portion 404 of the cancellation. The disconnection portion 404, which has received the notice, temporarily disconnects the communication from the communication portion 402 to the other network device 300a (FIG. 5: S113). In response to this, the change portion 405 changes the communication speed from the communication portion 402 to the other network device 300a, to a communication speed (initial communication speed, 1000BASE) that is higher than the communication speed (100BASE) in the sleep state (FIG. 5: S114). The re-linking portion 406 causes the communication portion 402 to communicate with the other network device 300a at the changed communication speed (FIG. 5: S115).

This allows the communication portion 402 to perform a communication job at the high communication speed when the multifunction peripheral 100 is in the normal state.

As described above, the multifunction peripheral 100 according to the present disclosure includes the disconnection portion 404, the change portion 405, and the re-linking portion 406. When the sleep signal instructing a shift from the normal state to the sleep state is received, the disconnection portion 404 temporarily disconnects the communication from the communication portion 402 to the other network device 300a. The change portion 405 changes the communication speed of the disconnected communication from the communication portion 402 to the other network device 300a, to a communication speed lower than the communication speed in the normal state. The re-linking portion 406 causes the communication portion 402 to communicate with the other network device 300a at the changed communication speed.

This allows the communication portion 402 to suspend a power supply to the circuit block that is included in the PHY 308b and transmits a clock corresponding to the high communication speed. As a result, this allows reducing unnecessary power supply to the circuit block and thus contributing to power saving. In addition, this allows changing the communication speed of the PHY 308b in the communication portion 402 through key operation by the user. As a result, for user convenience, this allows reducing the communication speed, and reducing power consumption accordingly.

It should be noted that the embodiment according to the present disclosure assumes the multifunction peripheral 100 as a network controller; however, the same advantageous effect can be produced when it is simply assumed as a network controller that controls the network with the other network device 300a and as a communication device.

In addition, the embodiment according to the present disclosure assumes a configuration such that the change portion 405 changes the communication speed from the communication portion 402 to the other network device 300a, to a communication speed (100BASE) that is one level lower than the communication speed in the normal state (1000BASE). However, the target communication speed need not be limited to this, and may be another low communication speed. For example, the communication speed may be 10Base.

In addition, in the embodiment according to the present disclosure, the communication portion 402 (communication portion 200) uses 1000BASE for the normal communication speed; however, the communication speed need not be limited to this, and may be another communication speed.

In addition, the embodiment according to the present disclosure assumes that the speed of the communication to the other network device 300a is changed to a communication speed lower than the communication speed in the normal state when the user presses the sleep key 602; however, the speed of the communication to the other network device 300a may be changed to a communication speed lower than the communication speed in the normal state, when the key having the same function as the sleep key 602 is pressed.

In addition, the embodiment according to the present disclosure assumes a configuration such that the multifunction peripheral 100 includes each portion, but the configuration may also be such that a recording medium, on which a program for realizing each portion is recorded, is provided. In the configuration, the multifunction peripheral 100 realizes each portion by causing the multifunction peripheral 100 to read out the program. In this case, the program itself that is read out from the recording medium produces an advantageous effect of the present disclosure. Furthermore, it is also possible to provide a method of storing, in a hard disk, steps to be performed by each portion.

What is claimed is:

1. A network controller that can be shifted from a normal state to a sleep state, comprising:
   a communication portion capable of communicating with another network device via a network;
   a disconnection portion configured to temporarily disconnect communication from the communication portion to the other network device when a sleep signal instructing a shift from the normal state to the sleep state is received;
   a change portion configured to change a communication speed of the disconnected communication from the communication portion to the other network device, to a communication speed lower than a communication speed in the normal state; and
   a re-linking portion configured to cause the communication portion to communicate with the other network device at the changed communication speed,
   wherein
   the disconnection portion temporarily disconnects the communication from the communication portion to the other network device when a sleep cancellation signal instructing a cancellation of the sleep state is received,
   the change portion changes the communication speed from the communication portion to the other network device, to a communication speed higher than a communication speed in the sleep state, and
   the re-linking portion causes the communication portion to communicate with the other network device at the changed communication speed.

2. A network controller according to claim 1, wherein
when a user presses a sleep key or when a time elapsed from a point of an activation of the network controller exceeds a predetermined sleep shift time, the sleep signal is received, and the disconnection portion temporarily disconnects the communication from the communication portion to the other network device.

3. A network controller according to claim 1, further comprising
a state control portion configured to shift the communication portion to low power idle (LPI) when the re-linking portion causes the communication portion to communicate with the other network device.

4. A network controller according to claim 3, wherein
during the sleep state, when the communication portion receives a communication job, the state control portion cancels the LPI while maintaining the communication speed from the communication portion to the other network device.

5. A network control method for use in a network controller that includes a communication portion capable of communicating with another network device via a network and that can be shifted from a normal state to a sleep state, the method comprising:
temporarily disconnecting communication from the communication portion to the other network device when a sleep signal instructing a shift from the normal state to the sleep state is received;
changing a communication speed of the disconnected communication from the communication portion to the other network device, to a communication speed lower than a communication speed in the normal state;
temporarily disconnecting the communication from the communication portion to the other network device when a sleep cancellation signal instructing a cancellation of the sleep state is received;
changing the communication speed from the communication portion to the other network device, to a communication speed higher than a communication speed in the sleep state; and
causing the communication portion to communicate with the other network device at the changed communication speed.

6. A network control method according to claim 5, wherein
when a user presses a sleep key or when a time that is elapsed from a point of an activation of the network controller exceeds a predetermined sleep shift time, the sleep signal is received, and the communication from the communication portion to the other network device is temporarily disconnected.

7. A non-transitory computer-readable recording medium on which a program for causing a computer to execute the network control method according to claim 5 is recorded.

* * * * *